Patented Mar. 1, 1927.

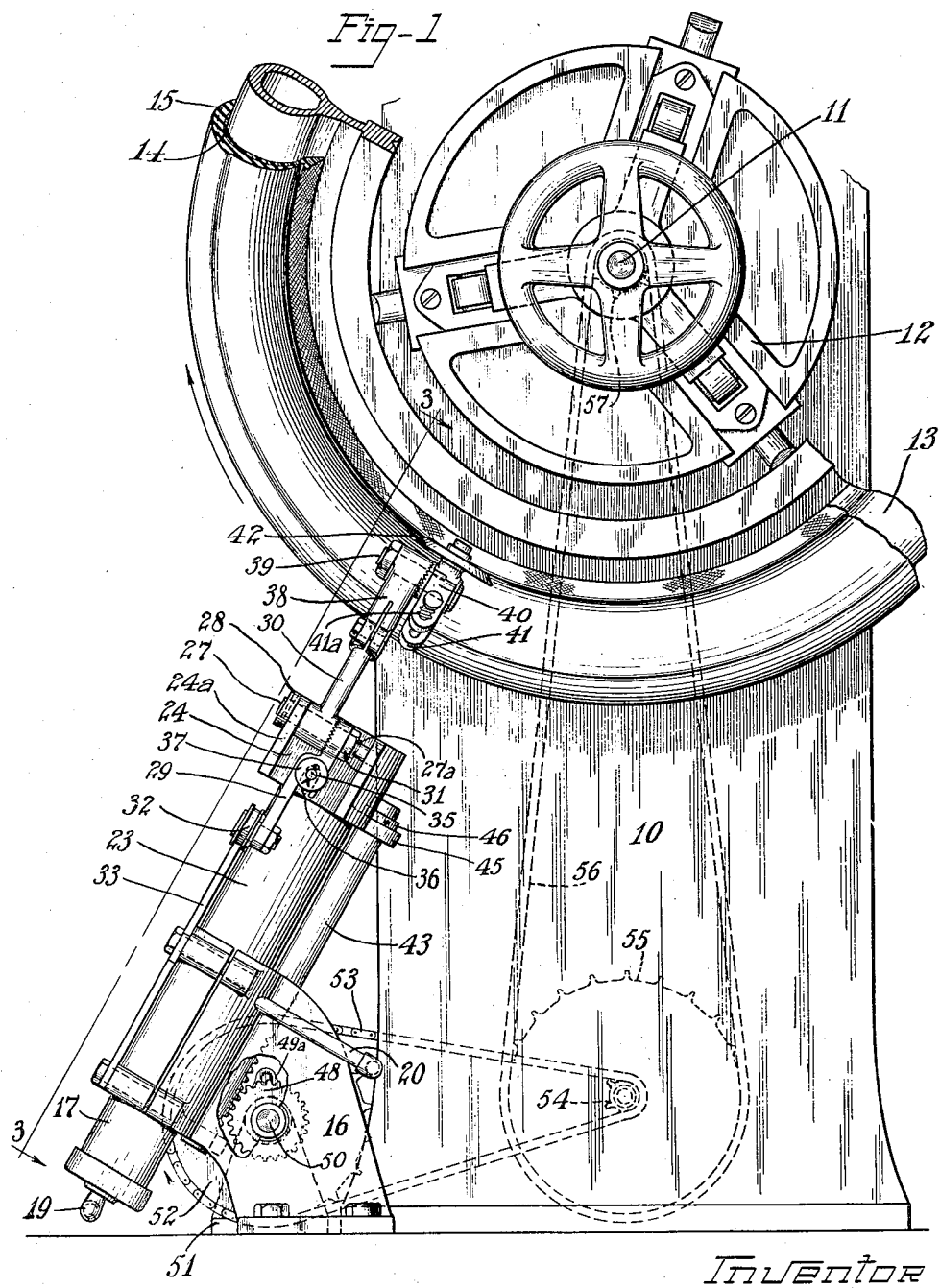

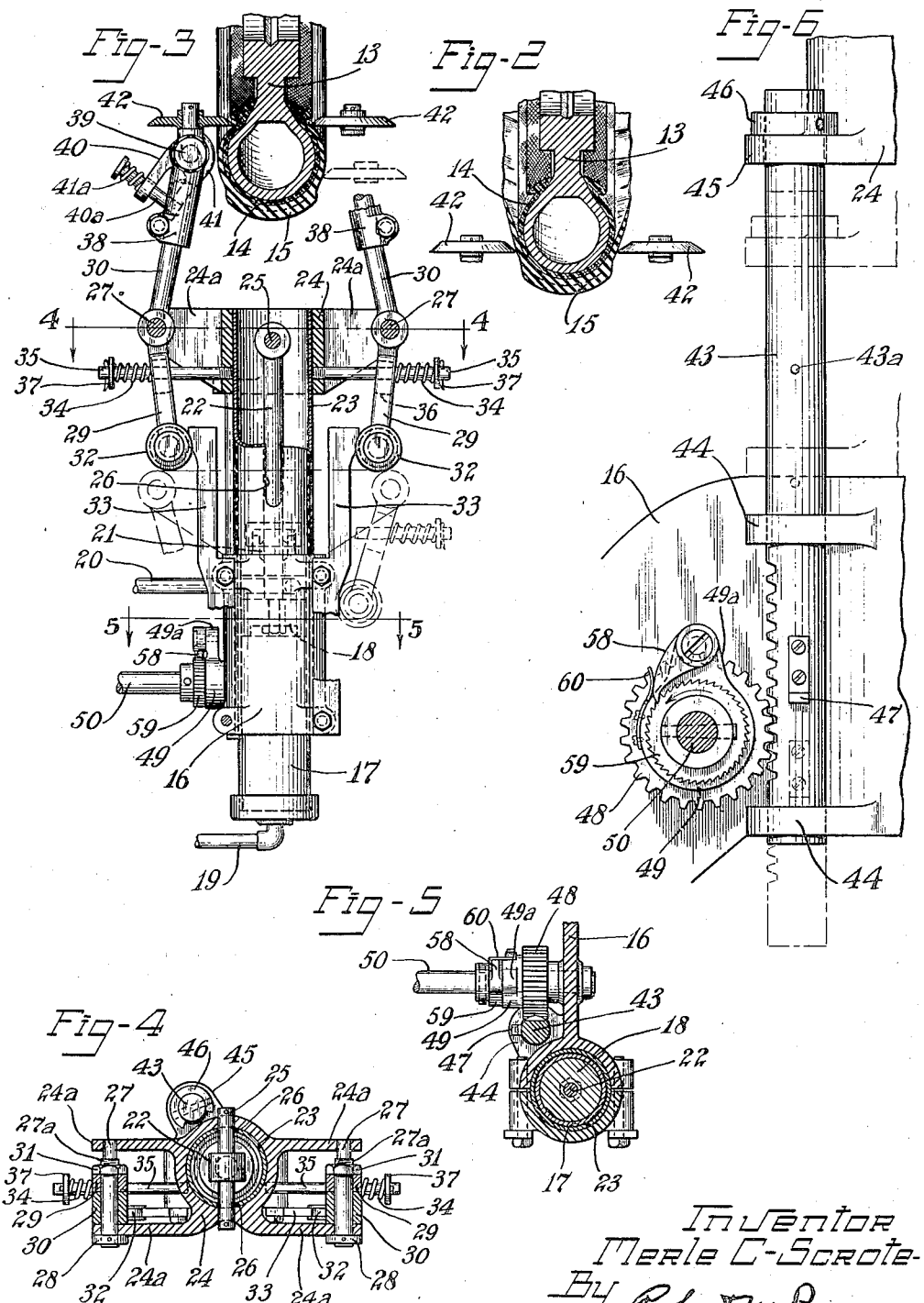

1,619,377

UNITED STATES PATENT OFFICE.

MERLE C. SCROTE, OF AKRON, OHIO, ASSIGNOR TO THE B. F. GOODRICH COMPANY, OF NEW YORK, N. Y., A CORPORATION OF NEW YORK.

TIRE-BUILDING APPARATUS.

Application filed April 29, 1924. Serial No. 709,795.

This invention relates to tire building apparatus, and more particularly to automatic apparatus for stitching into place tire-building material such as the respective sidewall portions of a combined tread and side wall strip, in the manufacture of pneumatic tire-casings.

The chief object of my invention is to provide apparatus for quickly, accurately and effectively working into shape the side wall portions of a tire casing in the manufacture thereof. A more specific object is automatically to bring a tire tool quickly to operative position, feed it at relatively slow speed during its engagement with the work, and then quickly restore it to its inoperative or retracted position, with the advantage of saving time and labor.

Of the accompanying drawings:

Fig. 1 is a front elevation of tire building apparatus embodying my invention in its preferred form, and the work thereon, the tire tools being shown in operative position.

Fig. 2 is a transverse section of a tire core and the work thereon, and a pair of stitcher rollers at their initial operating positions.

Fig. 3 is a section on line 3—3 of Fig. 1, parts being shown in elevation and broken away.

Fig. 4 is a section on line 4—4 of Fig. 3.

Fig. 5 is a section on line 5—5 of Fig. 3.

Fig. 6 is a fragmentary elevation, on a large scale, of part of the apparatus shown in Fig. 1, as viewed from the rear thereof.

Referring to the drawings, 10 is the frame of a tire building machine, 11 a rotatable spindle journaled therein, 12 an expansible chuck on the front end of the latter, and 13 an annular tire-building core mounted upon said chuck, the aforesaid parts being of any standard construction and the spindle being adapted to be driven by any usual or suitable means. The core 13 is shown with a tire in the course of construction thereon, 14 being the rubberized fabric carcass and 15 the reinforced rubber tread, which in this case includes integral side wall portions adapted to cover the respective sides of the tire as far as its beads. The devices for manipulating the fabric plies to form the tire carcass 14, and for attaching the tread strip 15 to said carcass at its tread portion only, as shown in Fig. 2, not being a part of this invention, are omitted from the drawings.

Secured in a floor-bracket 16 adjacent the machine frame 10 is an inclined fluid-pressure cylinder 17, radially disposed with relation to the tire core 13, and having the usual piston 18, a fluid pressure connection 19 in its lower end, a fluid pressure connection 20 at its upper end, and an upper end-closure member, including a stuffing-box 21 accommodating the piston rod 22.

Telescoped with the upper end of the cylinder 17 and clamped therewith in the bracket 16 is a cylindrical guide-sleeve 23, upon which is slidably mounted a cross-head 24, the latter being connected with the piston-rod 22 by a wrist-pin 25 which extends through respective longitudinal slots 26, 26 formed in opposite sides of said sleeve 23. Thus the cross-head 24, which carries the tools for operating upon the tread 15, is adapted to be raised and lowered to and from operative position as the respective ends of the cylinder 17 are alternately charged.

The cross-head 24 is formed with two pairs of parallel, spaced-apart, arms 24$^a$, 24$^a$, extending laterally of the tire-core 13, and each pair of arms having a pivot-pin 27 journaled in their outer ends, each pivot pin being provided with a retaining collar 28 at one end, outside its journal, and having its opposite end of reduced diameter, the pin being formed with a screw-thread 27$^a$ adjacent said reduced portion. Journaled on each pivot-pin is a downwardly-extending cam arm 29 and an upwardly-extending tool arm 30, said arms having their adjacent hub faces complementally serrated, and held together in angularly adjusted position so as to operate as a unit by a nut 31 on the threaded portion 27$^a$ of the pivot pin. The free end of each cam arm 29 is provided with a flanged cam-roller 32 coacting with a cam-plate 33 secured to the floor-bracket 16 and disposed longitudinally of the cylinder. The cam roller 32 is held yieldingly in engagement with the cam 33 by a helical compression spring 34, the latter being mounted upon a supporting rod 35 secured to the cross-head 24 and extending through a slot 36 (Fig. 1) in the cam-arm 29, said spring bearing against the outer face of said cam arm and against a collar 37 on the outer end of said rod 35.

Each tool-arm 30 is provided with a longitudinally adjustable bracket 38 having a clamping bolt 39 mounted in its free end, said bolt clamping against a serrated hub portion of the bracket 38 the serrated hub portion of an arm 40. Pivoted on the bolt 39 is a tool carrying lever 41 having a stitching roller or tool 42 journaled on one end thereof, the arm 40 being cut away at its hub to accommodate the lever 41 without subjecting the latter to the force of the clamping bolt 39, as shown in Fig. 1. Slidably mounted in an aperture in the outer end of the arm 40 is a spring bolt 40ª, one end thereof being pivoted to the outer arm of the tool carrying lever 41 and its other end being formed with a retaining head for a compression spring 41ª interposed between said head and the arm 40, for urging the stitching roller 42 against the work.

The cam plates 33 are so formed as to swing the stitching rollers 42 toward each other as the cross-head 24 approaches its uppermost position, to cause said rollers to follow the contour of the work, and to permit the springs 34 to swing said rollers outwardly during the return movement of the cross-head.

For reducing the speed of the radial movement of the cross-head 24 as the roller 42 engages the work, a rack 43 is slidably mounted parallel to the cylinder 17 in spaced-apart apertured ears 44, 44 formed on the floor bracket 16, the upper end of said rack passing through an aperture in an ear 45 formed on the cross-head 24, and provided with an adjustable collar 46 adapted to be engaged by said ear 45 during the outward or rising movement of said cross-head, said collar being so positioned as to be engaged at the same time that the roller 42 engages the work. An angular stop 47 secured to the rack 43 and extending laterally therefrom between the ears 44 is adapted by engagement with the lowermost of said ears, to determine the lower or inoperative position of said rack, and a stud or pin 43ª projecting from the rack 43 at a suitable point is adapted, to be engaged by the ear 45 during the return movement of the cross-head 24 to restore said rack to inoperative position in case its own weight is not sufficient for this purpose.

The rack 43 is meshed with a pinion 48 secured on a collar 49 loosely journaled on a driven shaft 50, the latter being journaled at one end of the floor-bracket 16, and at its other end in a floor-bracket 51 (Fig. 1) adjacent the rear of the tire building machine. Said shaft 50 is provided with a sprocket 52, and driven through a sprocket chain 53, sprocket 54, sprocket 55, sprocket chain 56 and sprocket 57, from the rotatable spindle 11 upon which the latter is mounted, the relative sizes of the respective sprockets being such that the shaft 50 is driven at relatively slow speed in comparison with the spindle 11.

The collar 49 is formed with a radial lug 49ª upon which is pivoted a pawl 58 which engages a ratchet 59 secured upon the shaft 50, said pawl being held yieldingly in engagement therewith by a flat spring 60 mounted upon the collar 49 and bearing against the free end of said pawl, the ratchet being adapted normally to run under the pawl as the shaft 50 rotates, counter-clockwise as viewed in Fig. 6, without turning the collar 49, but, by engagement with the pawl, to retard the turning of said collar and the pinion 48 thereon, and consequently to retard the rising of the rack and cross-head, when the upward movement of the cross-head 24 causes its ear 45 to engage the collar 46 on the rack 43 to draw the latter toward the work.

In the operation of my apparatus, a tire carcass 14 is built upon the annular core 13, a tire tread 15 applied thereto and rolled down at the tread portion of the tire in the usual manner, substantially to the position shown in Fig. 2 of the drawings. The tire assembly continuing to be rotated, the lower end of the cylinder 17 is charged, driving the cross-head 24 and rollers 42 mounted thereon toward the tire.

At the initial outward movement of the cross-head 24, the cams 33, acting against the springs 34, swing the rollers 42 toward each other, for engagement with the work as shown in Fig. 2, and hold their carrying arms 30 in substantially the same spaced relation until near the end of their radial movement toward the axis of rotation of the tire, when said cams swing the said arms 30 further toward each other, as shown in Fig. 3, to cause the spring-backed rollers 42 to follow the contour of the tire adjacent its beads. The springs 41ª of the roller mountings hold the rollers yieldingly against the work and permit said rollers to adjust themselves, throughout a sufficient range, to the curved contour of the tire, notwithstanding the fact that the cams 33 are not of a form corresponding precisely to the contour of the tire. Thus the cams determine the course of the rollers' hinge pins 39 about the tire, while the springs 41ª maintain the rollers yieldingly in engagement with the tire.

The collar 46 is so positioned on the rack 43 that the ear 45 engages it at approximately the same time the rollers 42 engage the work, and as said rack is drawn outward by the cross-head 24, the movement of the latter is retarded by the relatively slow rotation of the shaft 50 acting through the ratchet 59, pawl 58, and the pinion 48 meshed with said rack. The speed of the shaft 50 is so reduced with relation to the speed of the spindle 11, that the rollers 42, after engagement with the work, are advanced radially thereof slowly enough to permit them progressively to roll or stitch the unattached lateral portions of the tread strip 15 adhesively into contact with the sides of the tire carcass as far as the beads.

When the stitching operation is finished, the upper end of the cylinder 17 is charged and its lower end exhausted, lowering the cross-head 24 and rollers 42, the cam 33 permitting the springs 34 to spread apart the tool carrying arms and release the pressure of the tools upon the work as they are withdrawn radially therefrom. The rack 43 is returned to inoperative position by its own weight, or if this is not sufficient, by contact of said ear with the stud 43ª, the pawl 58 running upon the ratchet 59 during this return movement of the rack.

The rack mechanism constitutes positive drive, direct, hold-back means for retarding the advance of the tools by the fluid pressure cylinder, whereby the rate of the tools advance radially of the work is accurately determined, so that its spiral path upon the work is uniform upon successive tires, as distinguished from devices in which the radial movement of the tools depends upon the rate at which they are permitted to spread apart and so to wedge the tire between them under the force of simple yielding means urging them in a radial direction.

Modifications may be resorted to without departing from the scope of my invention, and I do not limit my claims wholly to the specific construction shown.

I claim:

1. Tire-building apparatus including means for supporting and driving the work, a stitcher roller, means for quickly advancing the same approximately into engagement with the work, and means for thereafter advancing said roller radially of the work toward the latter's axis of rotation in determinate relation to the speed of the work.

2. Tire building apparatus comprising a tire core, means for supporting and driving the same, a tire tool mounted adjacent thereto for movement into and out of contact with the work, yielding means for presenting said tool to the work by rapid movement and for moving it thereover toward the axis of rotation of the work, yielding means for urging the tool against the work while it is so moved, and hold-back means opposed to the first said yielding means for retarding the latter's movement of said tool while the tool is in operation upon the work.

3. Tire building apparatus comprising a tire core, means for supporting and driving the same, a tire tool mounted adjacent thereto for movement into and out of contact with the work, yielding means for presenting said tool to the work by rapid movement and for moving it thereover, and hold-back means having positive driving connection with said tire core for retarding the movement of the tool in contact with the work by said yielding means.

4. Tire building apparatus comprising a tire core, means for supporting and driving the same, a tire tool mounted adjacent thereto for movement into and out of contact with the work, fluid pressure means for presenting said tool to the work by rapid movement and for moving it thereover toward the axis of rotation of the work, yielding means for urging the tool against the work while it is so moved and hold-back means opposed to the first said fluid pressure means for retarding the latter's movement of said tool while the tool is in operation upon the work.

5. Tire building apparatus comprising a tire core, means for supporting and driving the same, a tire tool mounted adjacent thereto for movement into and out of contact with the work, fluid pressure means for presenting said tool to the work by rapid movement and for moving it thereover, and hold-back means having positive driving connection with said tire core for retarding the movement of the tool in contact with the work by said fluid pressure means.

6. Tire building apparatus comprising a tire core, means for supporting and driving the same, a fluid pressure cylinder disposed substantially radially of said core, a tire tool mounted operatively connected to said cylinder and adapted to be moved radially of the work by the direct action of said cylinder, hold-back means for retarding the action of said cylinder, a tire tool on said mounting, and cam means for laterally moving said tire tool to cause it to follow the contour of the work as it is moved radially of the latter by said cylinder.

7. Tire building apparatus comprising a tire core, means for supporting and driving the same, a fluid pressure cylinder disposed substantially radially of said core, a tire tool mounting operatively connected to said cylinder and adapted to be moved radially of the work by the direct action of said cylinder, hold-back means for retarding the action of said cylinder, a tire tool on said mounting, and yielding means for urging said tool against the work as it is moved radially of the latter by said cylinder.

8. Tire building apparatus comprising a tire core, means for supporting and driving the same, a tire tool mounted adjacent thereto for movement into and out of contact with the work, yielding means for presenting said tool to the work by rapid movement and for moving it thereover, hold-back means opposed to said yielding means for retarding the latter's movement of said tool while the tool is in operation upon the work and cam means for causing the tool to follow the contour of the work as it is moved thereover by the said yielding means.

9. Tire building apparatus comprising means for supporting and driving the work, a stitcher roller, fluid pressure means for advancing and retracting the latter to and from the work, and pawl and ratchet mechanism adapted to retard the advance of said roller by said fluid pressure means while said roller is engaged with the work.

10. Tire building apparatus comprising means for rotating a tire core while a tire is built thereon, nonmanual yielding means for advancing a tool into engagement with said tire, means for retracting it therefrom, and means operatively connecting the core-rotating means and the tool-advancing means for controlling the advance of said tool while the latter is engaged with said tire.

In witness whereof I have hereunto set my hand this 25th day of April, 1924.

MERLE C. SCROTE.